Patented July 17, 1923.

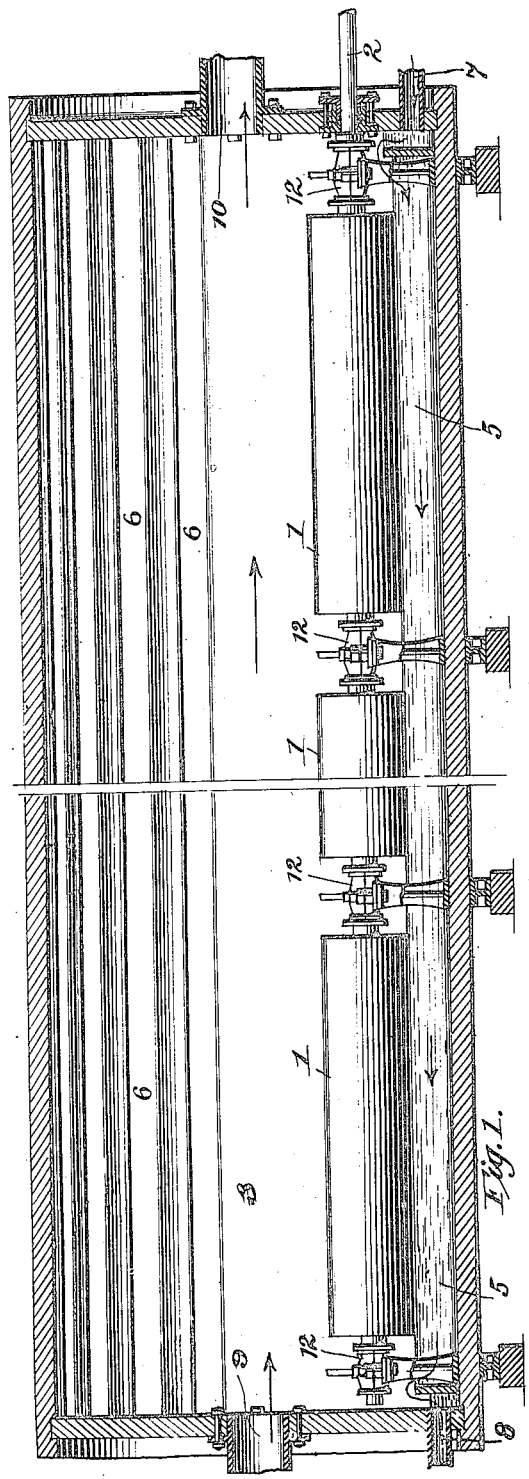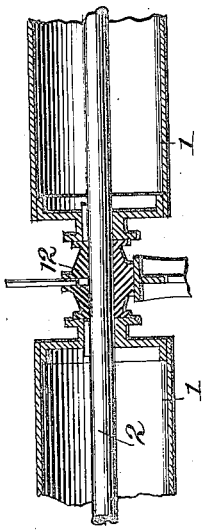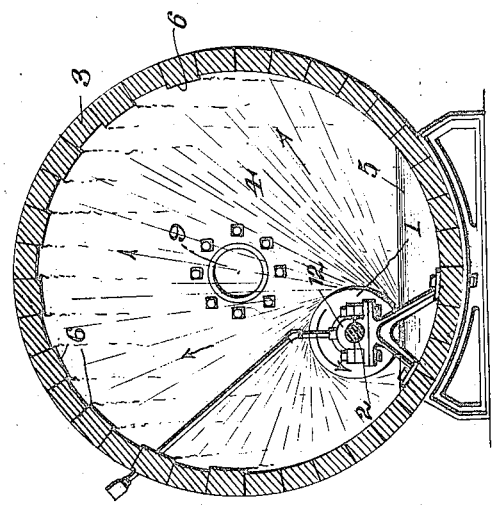

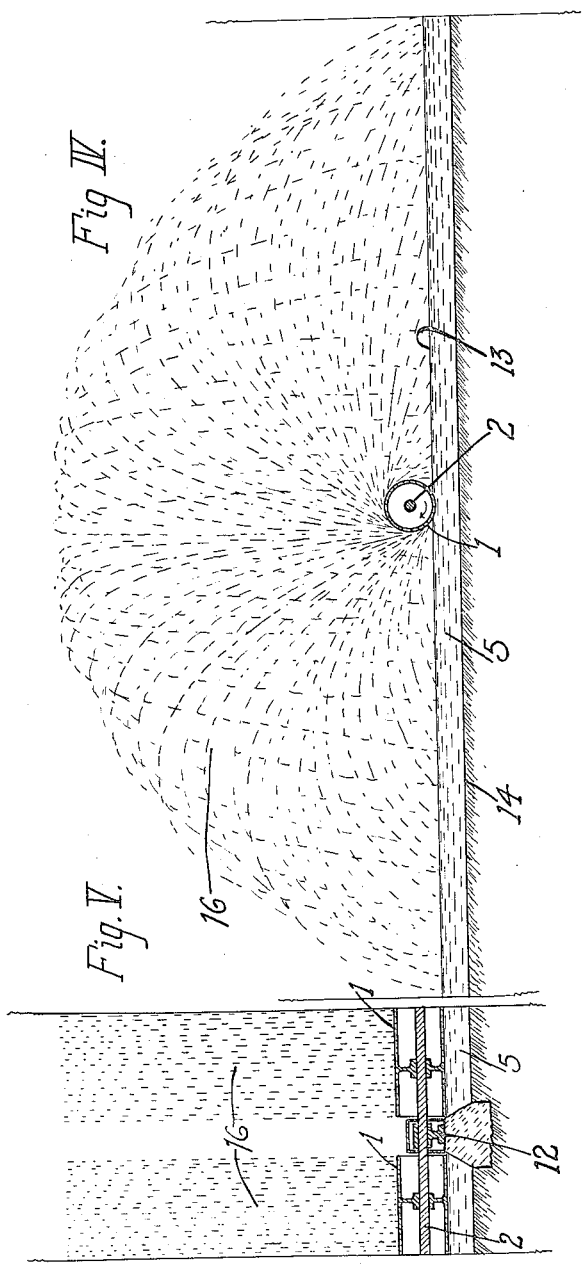
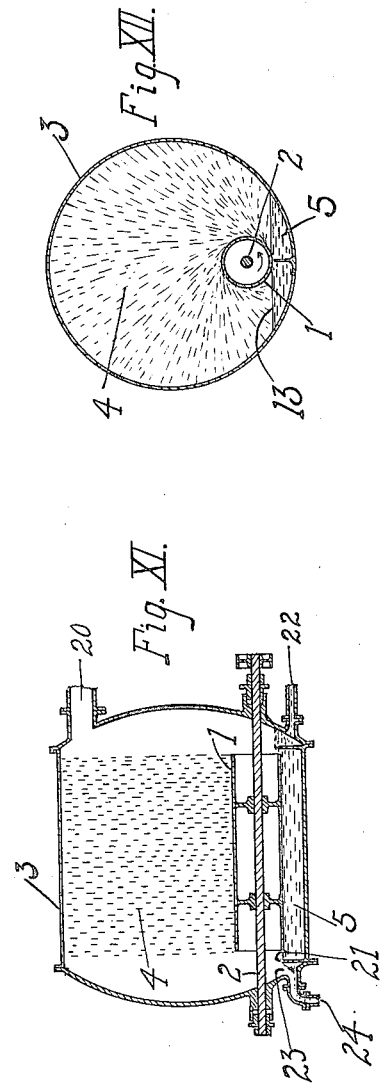

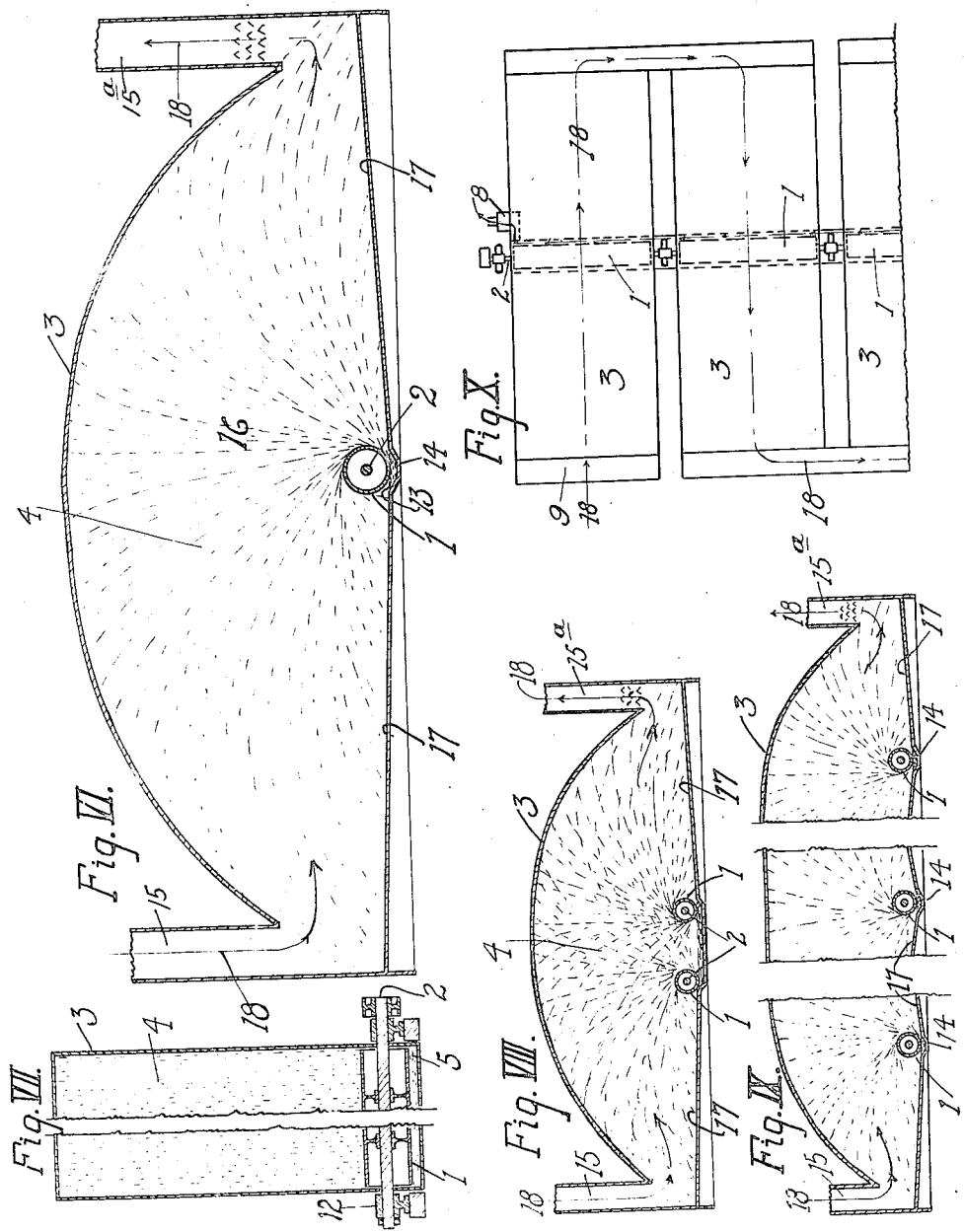

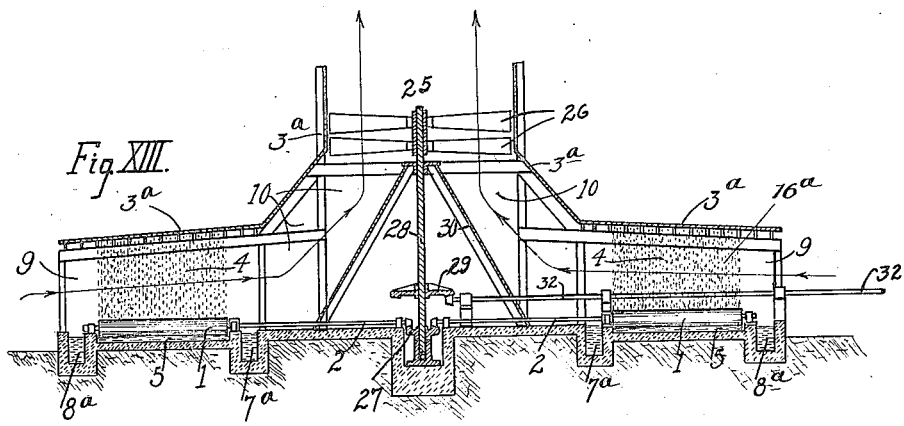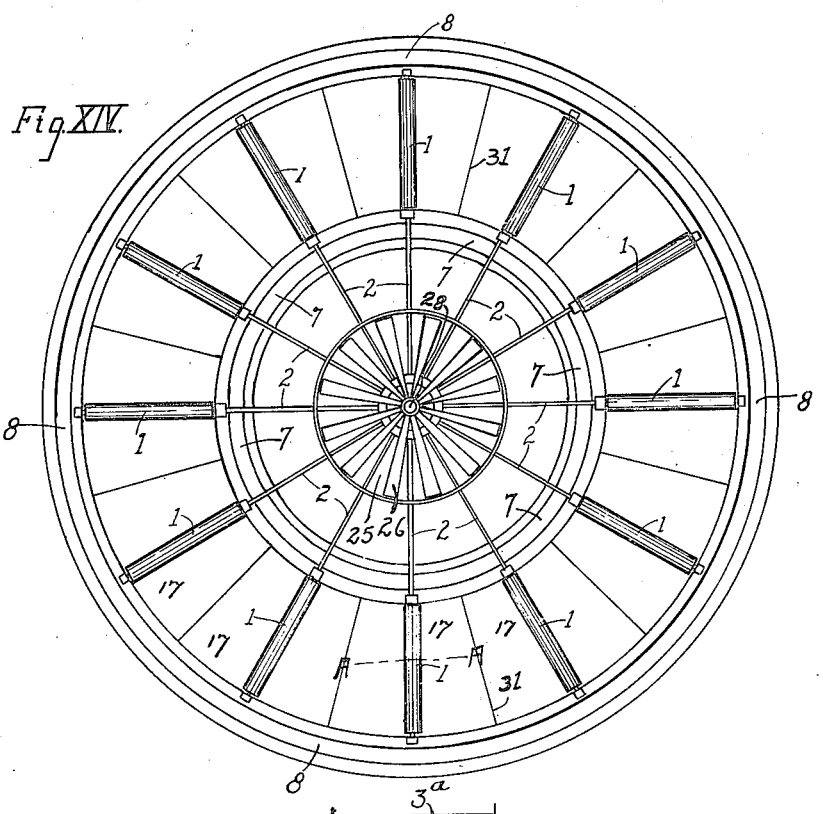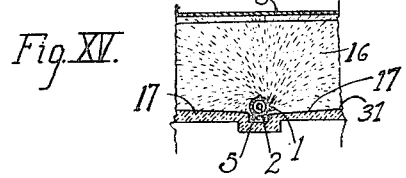

1,462,363

UNITED STATES PATENT OFFICE.

NIELS C. CHRISTENSEN, OF SALT LAKE CITY, UTAH.

METHOD OF AND APPARATUS FOR MAKING SPRAY FROM LIQUIDS AND COMMINGLING THE SAME WITH GASES.

Application filed May 27, 1919. Serial No. 300,185.

*To all whom it may concern:*

Be it known that I, NIELS C. CHRISTENSEN, a citizen of the United States, residing at Salt Lake City, in the county of Salt Lake and State of Utah, have invented certain new and useful Methods of and Apparatus for Making Spray from Liquids and Commingling the Same with Gases, of which the following is a specification.

My invention relates to methods and devices for making a spray from liquids, and for bringing liquid spray into intimate contact with gaseous or vaporous media in order to bring about the absorption of some of the constituents of said gaseous media in said liquid, or to remove some solid constituents carried by said media, or to bring about the cooling of said gaseous media by evaporation due to contact with said gaseous medium, or the condensation of said vaporous medium by contact with said liquid medium. My process and apparatus may be used for the absorption of acids or ammonia in the metallurgical or chemical industries, for purposes such as those for which cooling and absorption towers are now used; for the aeration and oxygenation or oxidation of solutions or pulps in the same fields or in sewage treatment; for the removal of solid particles such as dust from gases, such as is now done by different types of gas scrubbers; for cooling solutions or water such as is now done by different forms of cooling towers; for the condensation of steam, such as is now done by different types of condensers.

For all these purposes it is necessary that a very large surface of liquid be exposed to the gaseous medium, and in most of them that a counter current of liquid and gaseous medium be established. Only two methods of securing a large surface of liquid have been found at all economical, first the passing of the liquid through a tower filled with material to distribute the liquid over a large surface, and second the forcing of the liquid from a nozzle as a fine spray. In the first a good counter-current can be secured. The second is of little use where a counter-current is desired. The first requires the erection of very large and expensive towers and has the disadvantage that in counter current work the liquid can only come into contact with the gas once and this system is therefore relatively inflexible, and with acid proof construction is very expensive. The second requires the expenditure of a very large amount of power to secure an efficient spray.

By my method and apparatus, I avoid the large expense of towers and the inflexibility of the tower system and also avoid the large expenditure of power of the spray nozzle system. Beside these advantages I secure a great flexibility in operation in that the liquid may be brought into contact with the gaseous medium as many times as desired without destroying the counter current effect between the two.

My method and apparatus bring about these results by the formation of a spray by a very simple mechanical means and by a very simple method.

My apparatus consists in general of a cylindrical surface arranged to revolve with or around a central horizontal shaft or axis and supported above a body of liquid so that the upper surface of the body of liquid touches and is nearly tangent to the lowermost part of the cylindrical surface and so that the cylindrical surface dips to a slight extent only into the liquid. The method by which the rain or spray is made consists in revolving the cylindrical surface about its axis at the proper speed with the lower part of the cylindrical surface in contact with the upper surface of the body of liquid or dipping slightly into the liquid.

When the revolving cylindrical surface touches the surface of the liquid or dips into the liquid very slightly a film of the latter adheres to the cylindrical surface and, as such surface revolves, the liquid is thrown off of the same by centrifugal force in a relatively fine rain or spray, uniformly distributed, around the cylinder. The amount and fineness of the spray formed per unit of cylindrical surface may be varied with the depth to which the surface dips into the liquid, i. e., with the amount of cylindrical surface touching the liquid, the liquid and the speed of the surface; the faster the surface moves, the finer the rain or spray and the greater the amount, and the greater the amount of cylindrical surface in contact with the liquid the coarser the rain or spray and the greater the amount. The cylinder should dip into the liquid but very slightly as the power necessary to turn the cylinder is very greatly increased and the spraying effect largely destroyed if even a small portion of the cylinder is below the level of the surface of the liquid. The effect of allowing the lower portion of the cylinder to dip into the liquid is to carry a mass of water around with the cylinder and to agitate the body of liquid thus wasting the power applied to the cylinder. The cylindrical surface should be very nearly tangent to the surface of the body of liquid so that a very slight change in the level of the liquid surface makes a large change in the amount of cylindrical surface touching the liquid.

It should be noted that the action of the cylindrical surface in my invention is not in the nature of a pulverizing action due to the impact of the cylindrical surface with the body of liquid but is a relatively gentle action in which the revolving surface quietly carries up a film of water from the top of the body of liquid with practically no disturbance of the mass of liquid and discharges the water thus carried up in the form of a rain or spray of more or less finely divided particles of the liquid. By the term spray I do not mean the mist of very fine droplets such as is formed by the pulverizing action caused by the impact of a liquid on rapidly moving solid surfaces and forming a heterogeneous mass of fine droplets. The action of the revolving cylinder in my invention is entirely different when operated in the proper manner and at a correct or suitable speed the cylinder throws off a rain of drops from practically the entire surface of the pulley, the continuous discharge of these drops forming a solid fan of rain or spray (of a definite shape and of the same length as the cylinder) in the space surrounding the cylinder. The size and shape of the fan (i. e. in cross section) will depend upon the size and speed of revolution of the cylinder, the larger the cylinder and the higher the speed the larger the fan. The denseness of the rain or spray will depend upon the depth to which the cylinder dips into the liquid and the speed of revolution, the deeper the cylinder dips into the liquid (within the relatively narrow limits later specified) the more dense the rain or spray thrown by the cylinder, and the higher the speed the more liquid will be thrown from the cylinder. The size of the drops of liquid thrown by the cylinder and composing the rain or spray will also vary to a considerable degree, as noted above, with the depth to which the cylinder dips into the liquid and with the speed of the cylinder, the deeper the cylinder dips into the liquid the larger the drops, i. e. the coarser the rain or spray, and the faster the speed the finer the drops, i. e. the finer the rain or spray.

This effect of immersing or dipping the lower part of the cylinder to any considerable depth into the liquid varies with the size of the cylinder and the speed of revolution of the cylinder. The smaller the cylinder the smaller the depth to which the cylinder may be dipped without distorting the fan of rain or spray and destroying the spraying effect, and the slower the speed of revolution, the smaller is the depth of dipping into the liquid which distorts the fan of rain or spray and destroys the spraying effect. With small cylinders up to three inches in diameter the surface of the liquid must just touch the cylinder as otherwise the spraying effect is destroyed. With a four inch diameter cylinder revolving at 1350 R. P. M., the distortion of the fan of rain or spray begins at a depth of one eighth inch, at three sixteenths of an inch half the fan of spray disappears and at one quarter of an inch only a third of the fan of rain or spray remains, and even when this diameter cylinder revolves at 2700 R. P. M. and dips into the liquid only one half inch, all but one third of the fan of rain or spray is destroyed. With a six inch diameter cylinder revolving at 1070 R. P. M. the distortion of the fan of rain or spray begins at a depth of one quarter of an inch and at one half inch only half of the fan of rain or spray remains, and revolving at 1340 R. P. M., the distortion begins at less than a dipping depth of one half inch and at three quarters of an inch less than half of the fan of rain or spray remains. With an 8" diameter cylinder revolving at 760 the distortion of the fan begins at a depth of one half inch, one third of the fan is gone, and at three quarters of an inch depth of dipping only a one third of the fan of rain or spray remains, and with this diameter cylinder revolving at 1070 R. P. M. the distortion begins at a dipping depth of one half inch and at three fourths of an inch one half the rain or spray is gone and at one inch less than one third of the fan remains. With a twelve inch diameter pulley revolving at 485 R. P. M. the distortion of the fan of spray begins at a depth of one fourth of an inch, at one half inch one fourth of the fan is destroyed, at three fourths of an inch only half the fan of rain or spray remains and at one inch only one third of the fan remains; revolving at 690 R. P. M., the distortion of the fan of rain or spray commences at a dipping depth of one half inch, at three fourths of an inch one third of the fan has disappeared and at one inch half the fan is gone; revolving at 760 R. P. M. the distortion of the fan of rain or spray begins at a depth of three fourths of an inch, at one inch one third of the fan disappears and at a depth of an inch and a half less than half the fan remains. With a sixteenth inch diameter cylinder revolving at 490 R. P. M., the distortion of the fan of rain or spray begins at a depth of an inch and at an inch and one half one fourth of the fan is gone and at two inches nearly one half of the fan has disappeared. With a twenty four inch diameter pulley revolving at 350 R. P. M., the distortion of the fan of rain or spray begins at a depth of about two inches and at three inches half the fan of spray has disappeared. It should be particularly noted however that even before the distortion of the fan of rain or spray commences, as the cylinder dips deeper into the water the rain or spray becomes much coarser on the side of the fan toward which the bottom of the cylinder is moving so that the surface of the liquid in the drops in the spray does not increase even though the amount of liquid thrown by the cylinder increases, and thus the real spraying effect is destroyed.

From the foregoing it will be apparent that the cylinder should dip only slightly into the liquid, the maximum depth for efficient rain or spray throwing increasing with the size of cylinder and increasing with the speed of revolution of the cylinder. It will also be apparent from the foregoing that when the cylinder dips to any considerable depth the spraying effect and the efficiency of the cylinder as a rain or spray making machine is entirely destroyed. This will also be apparent from the following data on the power consumption of cylinders dipping to different depths. For example, a 12" diameter cylinder revolving at a speed of 725 R. P. M. and dipping to a depth of one sixteenth of an inch throws a light uniform fan of rain or spray and uses approximately ten watts per foot length of cylinder, or impeller, to throw this rain or spray; at a depth of one eighth inch a heavier fan of rain or spray is thrown taking about twenty watts; at a depth of one fourth of an inch a very dense uniform fan of rain or spray is thrown requiring approximately forty watts; at one half inch a very dense fan of rain or spray is thrown with considerably coarser drops on the side toward which the lower part of the cylinder is moving and using about 100 watts, at a depth of one inch the fan of rain or spray is distorted and one third of the fan is gone (the distortion taking place from the side toward which the bottom of the cylinder is moving and only a mass of very large drops being thrown on this side of the cylinder) and about 175 watts are used in throwing the rain or spray; dipping to a depth of one and a half inches less than half of the fan of rain or spray remains and approximately 250 watts are consumed; at a depth of 2" the fan of rain or spray has practically disappeared (only about one fourth being left which is thrown to the side toward which the top of the cylinder is moving) and about 400 watts are used; at a depth of three inches only a splashing of a mass of water results and the spraying effect has disappeared and about 525 watts are used to turn the cylinder. From the foregoing it will be readily seen that beyond a dipping depth of one fourth inch the efficiency of the apparatus decreases rapidly, at one inch the fan of rain or spray is distorted and partly destroyed and at the same time nearly twenty times as much power is used as is used at a depth of $\tfrac{1}{16}$ of an inch and over four times as much as is used at a depth of one fourth inch. Beyond a depth of one inch the efficiency of the apparatus decreases rapidly to practically zero at three inches with a consumption of power of over fifty times that required with a depth of one sixteenth of an inch and over thirteen times as much as that required at one fourth of an inch depth of dipping.

With larger cylinders the results are similar. For example, a sixteen inch diameter cylinder revolving at 490 R. P. M. dipping to a depth of one sixteenth of an inch throws a uniform light fan of rain or spray and requires about 12½ watts per foot length of cylinder or impeller; at a depth of one eighth inch a heavy uniform fan of rain or spray is thrown requiring about 25 watts; at one fourth inch a dense fan of rain or spray is thrown using about 50 watts; at a depth of one half inch a very dense fan of rain or spray composed largely of coarser drops on the side toward which the bottom of the cylinder is moving is thrown requiring about 80 watts; at a depth of one inch the drops on the side of the cylinder toward which the lower part of the cylinder is moving are still coarser and the distortion of the fan of spray commences and about 160 watts are used, from this depth the distortion and decrease in the size of the fan of spray becomes more pronounced until at three inches the spraying effect is practically gone and about 750 watts are used in turning the cylinder. It is thus seen that with this size cylinder beyond a dipping depth of three fourths of an inch, the usefulness of the apparatus as a spray thrower rapidly diminishes until at a depth of three inches the efficiency is practically zero. At a depth of one inch the spraying effect begins to deteriorate very rapidly and over twelve times as much power is used as is required at a depth of one sixteenth of an inch and over six times as much as is required at one fourth inch.

The depth to which the cylinder is allowed to dip into the liquid will be different according to the purpose for which the spray is used and will vary with the size and speed of the cylinder in order to secure the desired results. For most purposes however I have found that with smaller pulleys a depth of one sixteenth to one eighth inch gives the best results, with a twelve inch diameter pulley one sixteenth to one fourth inch gives the best results. With larger pulleys a depth greater than one fourth inch may give good results but for ordinary uses I have found that depths greater than this decrease rather than increase the efficiency of the apparatus for making a spray. As previously noted, however, the purpose to which the spray is put will determine the character of the spray and in cases where a large amount of coarse spray is needed slightly greater dipping depths may be used. As is evident from the data given the entire usefulness of the invention as a spraying or rain making device is destroyed if the cylinder dips to any considerable depth into the liquid.

The mechanical efficiency of my apparatus, i. e. its efficiency with regard to the power consumed in making the spray, is relatively very high if used in the proper manner. To secure a high efficiency it is necessary that the film of water removed by the cylindrical surface be removed with as little disturbance of the body of liquid as possible. If the body of the liquid is kept in agitation this energy thus used is wasted. I have found that the least agitation of the body of liquid is secured by means of the cylindrical surface being kept nearly tangent to or dipping very slightly into the surface of the liquid, as by this means the body of liquid is practically undisturbed. With discs or similar devices, however, this is not the case as these cause a considerable flow of liquid in the direction of the movement of the edge of the disc touching the liquid. This is due to friction of the water on the sides of the discs, and this is avoided by the use of the cylindrical surface. I have also found that the discs throw a relatively coarse stream of liquid in the direction of the motion of the disc while with the cylindrical surface this is avoided to a great degree. It is the relatively fine rain or spray thrown approximately uniformly from the entire surface of the cylinder that is the most efficient, and I have found that the cylindrical surface proves more satisfactory in the use of power than any form of apparatus which pulverizes the liquid by impact against solid surfaces, as is done with revolving paddles and discs and other devices of various kinds, and I have also found that the cylindrical surface gives a fan of rain or spray which is far more uniform in character and in distribution around the spraying device.

The general arrangement of my apparatus and the method of using it for different purposes is illustrated by the accompanying drawings, wherein, Fig. 1 illustrates the apparatus where it is necessary or desirable to secure a counter current of liquid and gas or vaporous media;

Fig. 2 a cross section thereof;

Fig. 3 a detail section;

Fig. 4 a vertical section of the apparatus and spray without any housing;

Fig. 5 a partially longitudinal vertical section of the same;

Fig. 6 a transverse vertical sectional view showing a form of housing designed to secure the benefit of as large a proportion of the fan of spray as possible, and illustrating a different flow of gases with regard to the spray from that shown in Fig. 1;

Fig. 7 a longitudinal vertical section of the same;

Figs. 8 and 9 vertical sections similar to Fig. 6 and showing a number of impellers located in a housing;

Fig. 10 a plan view illustrating a combination of such housings to secure a modified counter current between the liquid and gases;

Fig. 11 a longitudinal vertical section illustrating the invention when used in conjunction with vacuum or pressure;

Fig. 12 a transverse sectional view of such apparatus;

Fig. 13 a transverse vertical section illustrating an arrangement of the invention for a large installation adapted to handle a large volume of gases;

Fig. 14 a plan view thereof with the housing or cover removed; and

Fig. 15 a detailed vertical sectional view taken on the line A—A of Fig. 14.

In the drawings 1 indicates the cylindrical surface which is truly circular in cross section supported by a suitable spider with the arrow showing the direction of rotation; 2, the shaft on which or about which the cylinder revolves; 3, the enclosing tube or cylinder or passageway; 4, the space occupied by the spray and the gaseous or vaporous medium with arrows showing the general direction of flow of the gaseous medium; 5, the liquid medium or pulp with arrows showing the general direction of flow; 6 projections on inside of the tube or passage 3.

The manner of operation of the invention as illustrated in Figs. 1, 2 and 3, is as follows:

The liquid or pulp 5 enters the horizontal tube, preferably cylindrical in shape, at 7 and flows through the tube and is discharged at 8. The surface of the liquid or pulp is maintained at such a level that the surface of the cylinder (or cylinders) 1 touches or dips slightly into the surface of the liquid. The cylindrical surface 1, or surfaces which is formed by the outside of the cylinders supported on the shaft 2 which revolves in the bearings 12 at the desired number of revolutions per minute. The number of revolutions per minute will depend on the diameter of the cylindrical surface, distance to which the spray must be thrown, and the character of the spray desired. Using a 6 foot diameter enclosing tube or passage 3 I have found that a cylinder 1 twelve to fourteen inches in diameter revolving at from five hundred to seven hundred revolutions per minute gave the best results. As shown, the shaft carrying the cylinders is placed somewhat to one side of a vertical line through the center of the tube 3 in order to secure a more uniform distribution of spray. The gaseous or vaporous medium enters at 9 and flows through the tube in the direction indicated and the waste gases are discharged at 10. The general direction of flow of gaseous medium is opposite to the general direction of flow of the liquid medium. The action of the apparatus is as follows: A flow of liquid and gaseous media in opposite direction in the cylinder is established and power is applied to the shaft 2, causing it to revolve at the desired speed. As the cylindrical surface 1 turns in contact with the surface of the liquid a thin film of liquid is carried up by revolving surface and is thrown off by centrifugal force in a relatively fine rain or spray. This rain or spray passes through the gaseous medium in the space 4 and strikes the inside of the containing tube or passage 3 and runs off the projections 6 and falls in relatively large drops through the gaseous medium again and into the body of the liquid 5 and is again picked up by the cylindrical surface and passes through the same operation as many times as is desired. A very uniform rain or spray is thus secured filling the entire cross-section of the tube 3, and also filling the tube from end to end. A very intimate mixture of the gaseous or vaporous medium and the liquid or pulp is thus secured with the expenditure of very little power and a very efficient counter current effect secured. The liquid may also be brought into contact with the gaseous medium as many times as desired. The intimate mixture and counter current effect thus secured make this extremely efficient for the absorption of acids or ammonia from gases or for the removal of dust from gases, or for the bringing of gases or vapours into intimate mixture and contact with a liquid or pulp for any purpose whatsoever.

If it is not necessary or not desired to secure a counter current effect between the two media, as in cooling solutions or water as in steam engine practice, etc., or in aerating solutions or pulps or sludges as in sewage treatment, my method and apparatus may be used without the enclosing tube or passage 3, with the liquid in a pond or trough with the cylinder shaft supported above the liquid so that the cylindrical surface touches the surface of the liquid, or dips slightly into the liquid in the pond or trough. Thus for cooling condensing water or aerating sewage the apparatus may be entirely in the open above a pond, tank or trough and the rain or spray be thrown into the air and fall back into the pond. This makes a very simple and efficient method and device for the purposes named and especially in the treatment of sewage fills a long felt want for a simple and efficient method of aeration.

The invention may also be used for the condensation of steam, i. e. as a condenser, the cooling water being brought into intimate contact with the steam and effecting a very rapid and complete condensation. In this case the tube 3 would have to be closed in such a manner that the vacuum would be maintained.

The action of my invention in the open (i. e. not enclosed in a housing) and in the different types of tubes or housings, and in closed containers under suction or pressure is illustrated in the accompanying drawings. Fig. 4 shows a vertical cross section of the apparatus and the rain or spray as it appears when no housing or tube as 3 is used to contain the gases and rain or spray. Fig. 5 is a longitudinal section of the same.

The cylindrical surfaces or spraying impellers 1 revolving on the central shaft 2 are supported by the bearings 12, at a suitable level, in a horizontal position. The liquid surface 13 in the pond or trough 14 is maintained constantly at such a level that the cylinders or impellers 1 will be nearly tangent to the surface but so that they dip slightly into the liquid. The cylinders or spray impellers 1 are driven at the desired speed of revolution by any suitable driving mechanism applying power to the shaft 2. As before noted the exact detail of operation will depend on the results desired and the size and speed of the impeller 1. For many purposes a twelve inch diameter cylinder revolving at a speed of 650–775 revolutions per minute and dipping into the liquid to a depth of about one-fourth of an inch or less, has been found very efficient. This arrangement of my invention throws a solid fan of rain or spray 16 the full width of the impeller and of the shape shown in Fig. 4, extending approximately ten feet on each side of the impeller and to a height of approximately eight feet at the highest point. The rain or spray on the side toward which the lower part of the impeller is moving (as indicated by the arrow) is somewhat coarser than on the other side but the fan of rain or spray as a whole is very uniform in character and distribution. When operated as described this arrangement throws liquid (in the form of rain or spray) at the rate of approximately thirty gallons per minute per foot length of impeller and requires about $\frac{1}{16}$ H. P. per foot length of impeller to throw the spray (i. e. exclusive of the power used in driving the mechanism when no spray is thrown).

Different diameter cylinders may be used for different purposes. For throwing a very large fan of rain or spray, for solar evaporation of salt solutions and similar purposes cylinders as large as twenty four inches in diameter, or larger, may be used. The larger the cylinder the slower the speed of revolution necessary to throw the desired fan of rain or spray. Very small cylinders require such exact adjustment of water level and high speed of revolution and throw such a small fan of spray that they are not useful for many purposes.

In general it may be said that to secure a good fan of spray the cylinder should revolve at a speed within certain lower and upper limits. As the speed falls progressively lower below this lower limit the fan of rain or spray is distorted and thrown toward the side of the cylinder toward which the top of the cylinder is moving, this distortion increasing as the speed falls until the fan entirely disappears and only a mass of water is carried around by the cylinder. (As previously noted a similar effect occurs by increasing the depth beyond a certain limit to which the cylinder dips into the liquid.)

For example, with a cylinder one and five eighths inches in diameter dipping but very slightly into the liquid a speed of over 5000 R. P. M. is necessary to secure a complete fan of spray; a two and one half inch diameter cylinder requires a speed of over 2500 R. P. M.; a four inch diameter cylinder about 1250 R. P. M.; a six inch diameter cylinder about 750 R. P. M.; an eight inch diameter cylinder about 650; a twelve inch diameter cylinder about 450; a sixteen inch diameter cylinder about 350 and a twenty four inch diameter cylinder about 250 R. P. M. As the depth of dipping into the liquid increases from a slight depth such as one sixteenth, or less, to greater depths the speed of revolution must also be increased to secure a good distribution of the fan or spray. Excessively high speeds tend to distort the fan of spray in a direction opposite to that of the lower speeds and tend to throw a stream of very large drops of liquid in the direction of movement of the lower part of the cylinder, and a very fine rain or spray on the other side of the cylinder. With a twelve inch diameter cylinder I have found speeds from 500 to 800 R. P. M. according to the depth to which the pulley dips from one sixteenth to three eighths of an inch, to be satisfactory to form rain or sprays for many different purposes. To secure a very fine rain or spray the highest speeds and operating with the cylinder dipping only one sixteenth of an inch or less gives the most efficient operation.

When it is desired to take full advantage of as large a part of the fan of rain or spray as possible, a housing or tunnel or tube 3 of the general shape of the fan 16, but somewhat smaller in cross section than the cross-section of the fan of spray, may be used, as shown in Fig. 6. This enclosing tube may be entirely closed except at the ends and used for counter-current work as described for the circular tube or housing 3 in Fig. 1, or the gases may be passed through the housing transversely as shown in Fig. 6 in cases where no countercurrent effect is desired, as in gas washing or air washing to remove dust. Fig. 7 shows a vertical section of the arrangement of Fig. 6 on the center line of the impeller. As indicated by the broken lines the impeller may be of any desired length and the housing may be of any desired width. In this arrangement the liquid in the trough 14 is kept at the required level so that the revolving impeller dips slightly into the liquid as previously described. The impeller throws a solid fan of rain or spray filling the entire chamber or space 4 enclosed in the housing 3. The air or gas to be washed enters the chamber at one side through a channel 15, thence through the chamber and the spray therein and out through a channel 15ª at the other side. The course of the air or gas is indicated by the arrows 18. In making this passage the air or gas must pass through the fan of rain or spray 16, and any solid particles are wet by the spray and carried down into the trough 14 with the liquid. In this arrangement of my invention the bottom 17 of the housing or tube 3 may slope from the sides of the housing down to the trough 14 so that the liquid in the spray is constantly returned to the trough for reuse. This form of trough 14 and sloping floor 17 may also be used without the cover or housing for use in the open air instead of the pond arrangement shown in Fig. 4. As shown in Figs. 8 and 9 any number of parallel rows of impellers or cylinders 1 may be used in this type of housing giving any desired width of housing 3 and denseness of rain or spray according to the number of rows of impellers used and the closeness of their spacing. Fig. 10 shows a plan view of an arrangement of this type of housing or enclosing tube 3 which may be used to secure a kind of countercurrent flow of liquid and gaseous media. As shown this arrangement consists of a number of housings or compartments 3 of the type shown in Figs. 6 and 7, placed side by side, so that the impellers are end to end. The direction of flow of the gases is indicated by the arrows 18. By using a number of sections as indicated a good countercurrent effect may be secured. In all these enclosed arrangements of my invention the gaseous medium will be caused to flow through the tunnel or housing in the desired direction by suitable fans (or other suitable means). It will be apparent from the foregoing that a multitude of different arrangements of my apparatus may be made to suit any desired application of the spray.

In case it is desired to apply the liquid rain or spray to gaseous media under vacuum or pressure the container 3 will be made of a suitable design and material to withstand the pressure either internal or external. The arrangement of this kind using my invention for condensing vapors with the cold liquid is shown in Figs. 11 and 12. In this arrangement the vapor enters the chamber 3 through the pipe 20 and comes into contact with the spray and is condensed. The proper level of the cold liquid is maintained by a suitable overflow weir at 21. The cold condensing liquid enters through the pipe 22 and is withdrawn from the overflow space 23 by a suitable pump (not shown) through the pipe 24.

For large installations of my invention in which it is necessary to bring very large volumes of air into contact with the rain or spray, as for large water-cooling installations, the arrangement shown in Figs. 13, 14 and 15 is my preferred type. In this arrangement, a number of impellers or cylinders 1 are placed at equal distances, on radii, from a central point and at equal intervals around the circle, i. e., the axes of the cylinders radiate from a common center and are arranged with equal angles between the axes, and the cylinders 1 are all equidistant from the center. The housing 3 consists of an annular roof $3^a$ above the impellers 1 and is connected with a short central circular air shaft 25 by the air outflow passage 10 and is open at the periphery giving a large inflow opening 9. A fan 26 is arranged to rotate in the outlet shaft 25. The shafts 2 on which the impellers revolve all run to the central gear 27 (which drives the impellers) on the central vertical shaft 28. The central vertical shaft 28 carries the fan 26, the impeller drive gear 27 and the main drive gear 29. Power is applied to the gear 29 from the shaft 32 as indicated, or directly from a motor. These gears are all covered by the conical housing 30 so as to be protected from the spray. Beneath each impeller 1 is a radial trough 5 extending from the inner circular inflow trough $7^a$ to the outer circular outflow trough $8^a$. The outflow from the troughs 5 is at such a level that the impellers dip into the liquid to the desired depth. The floor of the annular space between the impellers slopes from a median radial line or ridge 31 to the trough on each side as indicated in Figs. 14 and 15, the sloping surfaces being indicated by 17. The annular roof or housing $3^a$ preferably slopes slightly downward toward the outer periphery and is open around the entire periphery forming the circular air inflow opening 9. The impellers are spaced at such intervals apart and the roof at such a distance above the impellers, that an annular ring of rain or spray $16^a$ completely fills the space 4 between the annular floor 17 and the annular roof $3^a$. The operation is as follows: For example, for water cooling, power is applied to the central driving gear 29 which causes the fan 26 and impellers to rotate at the desired speed. Water to be cooled is fed into the inlet trough $7^a$ and flows through the radial troughs 5 into the outlet trough $8^a$. The impellers 1 throw a solid ring of rain or spray $16^a$ filling the annular spray space 4 between the roof $3^a$ and floor 17 and the fan 26 draws the air from the entire peripheral inlet 9 through the ring of spray and into the annular outlet space 10 and discharges it through the central air shaft 25. It will be seen that a counter-current of water and air is secured in this arrangement and that a very large air inlet and outlet is secured which makes possible the use of a very large volume of air at a very low velocity, giving a high cooling efficiency with a small expenditure of power.

It will be apparent that the direction of flow of air and water may be reversed and other minor changes made. Instead of a single trough for each impeller a large annular trough may be employed common to all the impellers. The arrangement illustrated is, however, preferred.

It is manifest from the foregoing that the invention is applicable to many uses and is subject to numerous variations, and I therefore do not desire to be limited to any of the specific arrangements described, and the claims are to be interpreted in the light of this statement of the invention.

These are only a few illustrations of the uses for my process and apparatus, many others will suggest themselves to those working in different engineering fields, such as acid absorption, ammonia absorption, evaporating liquids, gas washing, gasoline absorption from natural gas, etc.

The design of my apparatus as to dimensions and general arrangement and as to details of construction will of course vary greatly according to the purpose for which the apparatus is used. Many slight variations may be introduced in the design for special purposes. The kinds of material used in the construction of the apparatus will also vary with the use to which it is put. One great advantage of my invention is that the apparatus is easily made of acid proof material. The possible variations in detail of construction and arrangement are too numerous to be mentioned in a patent specification. I, therefore, do not desire to be limited in any way to the particular types of arrangement or design shown but only by the description as set forth in the appended claims.

Having described my method and apparatus what I claim and desire to patent is:

1. The method of spraying liquids which consists in revolving a rigid imperforate circular-cylindrical surface dipping slightly into a body of liquid with its axis substantially parallel to the upper surface of said body of liquid, at such a speed about its axis that liquid continuously carried out of said body on said cylindrical surface, is thrown from said surface as a rain of liquid drops forming a substantially continuous fan of spray radiating from said cylindrical surface.

2. The method of securing an intimate mixture of liquid and gaseous media which consists in revolving a rigid imperforate circular-cylindrical surface, dipping slightly into a body of the liquid medium with its axis substantially parallel to the upper surface of said body of liquid, at such a speed about its axis that liquid, continuously carried out of said body on said cylindrical surface is thrown from said surface as a rain of liquid drops forming a substantially continuous fan of spray radiating from said cylindrical surface and mixed with the gaseous medium in the space occupied by said fan of spray.

3. The method of securing an intimate mixture of liquid and gaseous media which consists in revolving a rigid imperforate circular-cylindrical surface dipping slightly into a body of the liquid medium with its axis substantially parallel to the upper surface of said body, at such a speed around its axis that liquid continuously carried out of said body on said cylindrical surface is thrown from said surface as a rain of liquid drops forming a substantially continuous fan or spray radiating from said cylindrical surface, and passing a current of the gaseous medium through said fan of spray.

4. The method of securing an intimate mixture of liquid and gaseous media which consists in revolving a rigid imperforate circular-cylindrical surface dipping slightly into a body of the liquid medium with its axis substantially parallel to the upper surface of said body at such a speed around its axis that liquid continuously carried out of said body on said cylindrical surface is thrown from said surface as a rain of liquid drops forming a substantially continuous fan of spray radiating from said cylindrical surface, and passing a current of the gaseous medium through said fan of spray in a direction parallel to the axis of said cylindrical surface.

5. The method of securing an intimate mixture of liquid and gaseous media, concurrent with a counter-current flow of said liquid and gaseous media, which consists in revolving a rigid imperforate circular-cylindrical surface dipping slightly into a body of the liquid medium, with its axis substantially parallel to the upper surface of said body, at such a speed around its axis that liquid continuously carried out of said body on said cylindrical surface is thrown from said surface as a rain of liquid drops forming a substantially continuous fan of spray radiating from said cylindrical surface, and continuously returning the sprayed liquid to said body of liquid and causing a flow of said body of liquid at such a rate in one direction parallel to the axis of said cylindrical surface, and passing a current of the gaseous medium through said fan of spray at such a rate in the opposite direction parallel to the axis of said cylindrical surface, that different portions of the liquid medium are sprayed into mixture with the gaseous medium a number of times during its flow from one end of said cylindrical surface to the other and each portion of gaseous medium is brought into mixture with different portions of the liquid medium in the form of spray a number of times during its passage through said fan of spray.

6. In an apparatus for spraying liquid media, the combination of a rigid imperforate circular-cylinder arranged to revolve about its axis with said axis in a substantially horizontal position; a container located beneath the cylinder for holding the liquid to be sprayed; means for maintaining the upper surface of the liquid at such level that the cylinder will dip to a slight extent only into the liquid; and means for revolving said cylinder at such a speed that the liquid in the container will be carried up therefrom on the outer surface of the cylinder and will be thrown from said surface as a rain of liquid drops forming a substantially continuous fan of spray radiating from said surface.

7. In an apparatus for spraying liquid media, the combination of a rigid imperforate circular-cylinder arranged to revolve about its axis with said axis in a substantially horizontal position; a container for the liquid to be sprayed arranged below said cylinder; means to maintain the level of the liquid such that the cylinder will dip to a slight extent only into the liquid; means arranged upon the container to return the sprayed liquid to said container; and means for revolving said cylinder at such a speed that the liquid in said container will be carried up on the outside surface of said revolving cylinder and will be thrown therefrom as a rain of liquid drops forming a solid fan of spray radiating from said cylinder.

8. In an apparatus for securing an intimate mixture of gaseous medium and liquid spray, the combination of a rigid imperforate circular-cylinder arranged to revolve about a horizontally disposed axis; a housing surrounding said cylinder and adapted to hold a body of liquid in the lower portion thereof; means for maintaining the upper surface of the liquid in the housing at such a level that the cylinder will dip to a slight extent only into such liquid; means for revolving said cylinder at such a speed that the liquid will be carried up from the body on the outside surface of the revolving cylinder and thrown therefrom as a rain of liquid drops forming a solid fan of spray which substantially fills the space enclosed in the housing; and means for passing a current of gaseous medium through the spray in said housing.

9. In an apparatus for securing an intimate mixture of gaseous medium and liquid spray, which comprises in combination a rigid imperforate circular-cylinder arranged to revolve about a horizontally disposed axis; a housing around said cylinder and spaced therefrom, said housing being adapted to hold a body of liquid in the lower portion thereof and arranged to return sprayed liquid to said lower portion, the walls of said housing against which the spray is thrown being substantially parallel to the axis of the cylinder; means for maintaining the upper surface of a body of liquid in the lower portion of said housing at such a level that the cylinder will dip slightly into such body; means for revolving said cylinder at such a speed that the liquid which is carried up from the body liquid on the outside surface of said revolving cylinder will be thrown from said surface as a rain of liquid drops forming a solid fan of spray substantially filling the space enclosed by the housing; and means for passing a current of gaseous medium through said spray in a direction substantially parallel to the axis of the cylinder.

10. In an apparatus for securing an intimate mixture of gaseous medium and liquid spray concurrent with a countercurrent flow of said liquid and gaseous medium, which comprises in combination, an elongated rigid imperforate circular-cylinder arranged to revolve about a substantially horizontal axis; a housing for said cylinder, the walls whereof against which the spray is thrown stand substantially parallel to the axis of the cylinder; means for maintaining a body of liquid in the lower portion of the housing at such a level that the cylinder will dip slightly into said body; means for revolving said cylinder at such a speed that liquid will be carried up from the body on the outer surface of the cylinder and will be thrown from said surface as a rain of liquid drops forming a solid fan of spray filling the space within the housing; means for passing a current of gaseous medium through said housing in one direction parallel to the axis of the cylinder; and means for introducing liquid into the housing at one end and removing it at the opposite end so as to cause a flow of liquid through the housing in a direction opposite to the flow of said gaseous medium.

NIELS C. CHRISTENSEN.